(12) United States Patent
Mallary et al.

(10) Patent No.: US 7,184,241 B1
(45) Date of Patent: Feb. 27, 2007

(54) DISK DRIVE THAT PERFORMS COLD WRITES TO ERASED BUFFER

(75) Inventors: Michael Mallary, Sterling, MA (US); Yan Wu, Cupertino, CA (US); John VanLaanen, Longmont, CO (US); Bruce Buch, Westborough, MA (US); Jeffrey V DeRosa, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/157,587

(22) Filed: Jun. 21, 2005

Related U.S. Application Data

(60) Provisional application No. 60/632,381, filed on Dec. 2, 2004.

(51) Int. Cl.
*G11B 5/596* (2006.01)
*G11B 5/02* (2006.01)
*G11B 15/18* (2006.01)

(52) U.S. Cl. ............ 360/78.04; 360/57; 360/72.2
(58) Field of Classification Search ............ None
See application file for complete search history.

(56) References Cited

U.S. PATENT DOCUMENTS

| | | | |
|---|---|---|---|
| 5,461,603 A * | 10/1995 | Otsuka | 369/53.18 |
| 2003/0081337 A1* | 5/2003 | Tanimoto | 360/60 |
| 2004/0264028 A1* | 12/2004 | Ishii et al. | 360/69 |

* cited by examiner

*Primary Examiner*—Hoa T. Nguyen
*Assistant Examiner*—Jason Olson
(74) *Attorney, Agent, or Firm*—Myers Bigel Sibley & Sajovec, PA

(57) ABSTRACT

A disk drive includes a rotatable data storage disk, a transducer, an actuator, and a controller. The transducer is configured to read and write data on the disk. The actuator is configured to position the transducer relative to defined portions of the disk. The controller is configured to write a predetermined magnetic polarity pattern on a buffer portion of the disk to erase data thereon. The controller also determines whether the disk drive has reached a threshold operating temperature, and to selectively direct data from a host device, which is addressed for an associated original block address on the disk, to be written to the buffer portion of the disk when the disk drive has not reached the threshold operating temperature. The controller later copies the data from the buffer portion of the disk to the original block address on the disk and then erases the data from the buffer portion of the disk.

27 Claims, 13 Drawing Sheets

DISK DRIVE THAT PERFORMS COLD WRITES TO ERASED BUFFER

RELATED APPLICATION

This application claims the benefit of and priority to U.S. Provisional Patent Application No. 60/632,381, filed Dec. 2, 2004, the disclosure of which is hereby incorporated herein by reference as if set forth in its entirety.

FIELD OF THE INVENTION

The present invention generally relates to digital data storage devices and, more particularly, to writing data in a magnetic disk drive.

BACKGROUND OF THE INVENTION

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent to surfaces of the disks to transfer data between the disks and a host computer. The transducers can be radially positioned over the disks by a rotary actuator and a closed loop, digital servo system, and can fly proximate to the surfaces of the disks upon air bearings. The transducers each typically contain a separate read element and write element.

Data is stored within concentric tracks on the disks. The magnetic recording disks are coated with a magnetic material that is capable of changing its magnetic orientation in response to an applied magnetic field. To write data to or read data from a disk, a transducer is positioned above a desired track of the disk while the disk is spinning.

Writing is performed by delivering a write signal having an alternating current to the write element. The write signal creates an alternating orientation magnetic field at a gap portion of the write element that induces magnetic polarity transitions in the magnetic material of the disk, and which thereby creates a data region on the track. The magnetic polarity transitions are representative of the stored data. Reading is performed by sensing magnetic polarity transitions previously written on tracks of the disk with the read element. As the disk spins below the transducer, the magnetic polarity transitions along a track present a varying magnetic field to the read element. The read element converts the magnetic signal into an analog read signal.

The interior temperature of a disk drive can vary significantly from when it is initially powered on to when it reaches a normal operating temperature. The interior temperature may increase, for example, about 10° C. to 15° C. during the first 15 to 30 minutes of operation. The operation of the disk drive can be effected by variation of its temperature.

SUMMARY OF THE INVENTION

In some embodiments of the present invention, a disk drive includes a rotatable data storage disk, a transducer, an actuator, and a controller. The transducer is configured to read and write data on the disk. The actuator is configured to position the transducer relative to defined portions of the disk. The controller is configured to write a predetermined magnetic polarity pattern on a buffer portion of the disk to erase data thereon. The controller may erase data from the buffer portion of the disk by causing an alternating current to be conducted through the transducer to write a pattern of alternating opposite polarity magnetic areas over the data. The alternating polarity areas that are written to erase the data may have a shorter length than individual bits of the data. The controller also determines whether the disk drive has reached a threshold operating temperature. When the disk drive has not reached the threshold operating temperature, the controller selectively directs data from a host device, which is addressed for an associated original block address on the disk, to be written to the buffer portion of the disk. The controller later copies the data from the buffer portion of the disk to the original block address on the disk and then erases the data from the buffer portion of the disk.

In some other embodiments, the controller generates extended error correction information from data that is to be written to the disk. The extended error correction information can allow detection and correction of more errors in data than error correction information that is encoded as part of the data written to the disk. When the disk drive is determined to have not reached the threshold operating temperature, the controller writes the extended error correction information to the buffer portion of the disk. The extended error extended correction information in the buffer portion is then used to attempt to correct errors in data that is read from the disk.

In some other embodiments, the controller generates extended error correction information from data that is to be written to the disk. When the disk drive is determined to have not reached the threshold operating temperature, the controller writes the extended error correction information to an integrated circuit memory in the disk drive. The integrated circuit memory can include, for example, a semiconductor memory and/or a magnetic memory. The extended error correction information in the integrated circuit memory is then used to attempt to correct errors in data that is read from the disk.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
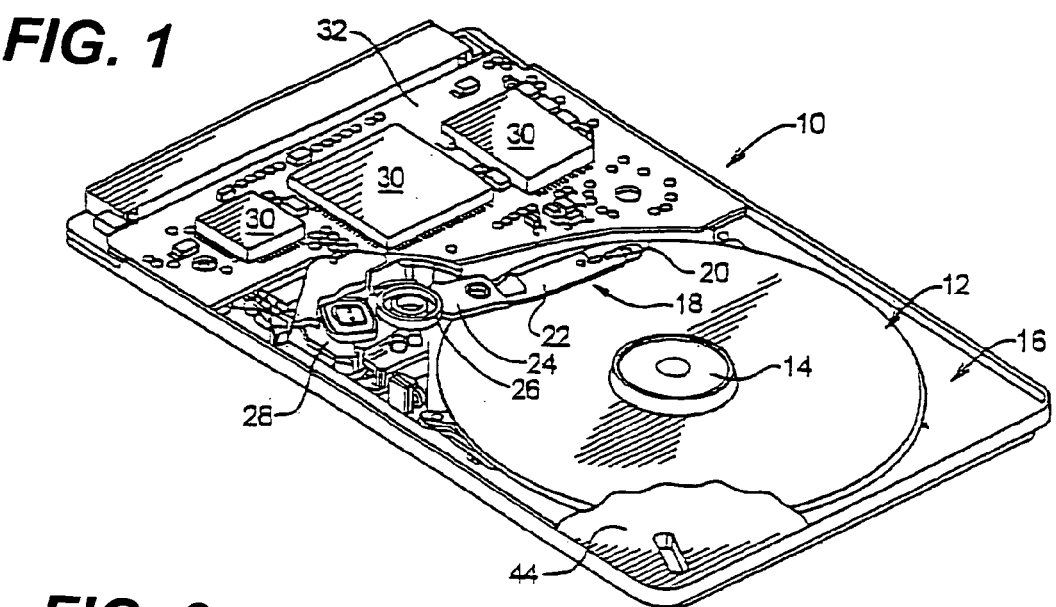
FIG. 1 is a perspective view of a disk drive that is configured in accordance with some embodiments of the present invention.

A simplified diagrammatic representation of an exemplary disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write commands and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a transducer 20 (or head) mounted to a flexure arm 22 which is attached to an actuator arm 24 that can rotate about a pivot bearing assembly 26. The transducer 20 may include, but is not limited to, a magnetoresistive (MR) element, a thin film inductive (TFI) element, and/or a inductive coil element. The actuator arm assembly 18 also includes a voice coil motor (VCM) 28 which moves the transducer 20 relative to the disk stack 12. The spindle motor 14 and actuator arm assembly 18 are coupled to a controller and associated electronic circuits 30 mounted to a printed circuit board 32. The controller 30 may include analog and/or digital circuitry, and typically includes a digital signal processor (DSP), a microprocessor-based controller and a random access memory (RAM) device.

As will be explained in more detail below, the controller 30 is configured to read and write data from the disk stack 12 responsive to read and write commands from a host device. Also in accordance with some embodiments of the present invention, the controller 30 is further configured to respond to a write command from the host device by writing associated data to an erased buffer portion of the disk stack 12 when the disk drive 10 is determined to have not reached a threshold operating temperature. The controller 30 later copies the data from the buffer portion of the disk stack 12 to an original block address associated with the write command, and erases the data from the buffer portion of the disk stack 12 after the data has been copied therefrom. Writing data in this manner before the disk drive 10 has reached a sufficient operating temperate may increase the accuracy with which data is stored on the disk stack 12.

Figure 2:
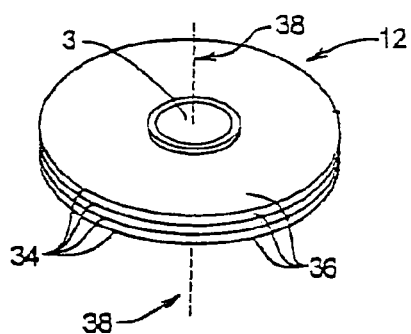
FIG. 2 is a block diagram of a disk stack having a plurality of data storage disks.

Referring now to the illustration of FIG. 2, the disk stack 12 typically includes a plurality of disks 34, each of which may have a pair of disk surfaces 36, 36. The disks 34 are mounted on a cylindrical shaft and are configured to rotate about axis 38. The spindle motor 14 as mentioned above, rotates the disk stack 12. Although the disks 34 are described as magnetic disks for purposes of illustration, they may alternatively be optical disks or any other type of rewritable data storage disk.

Figure 3:
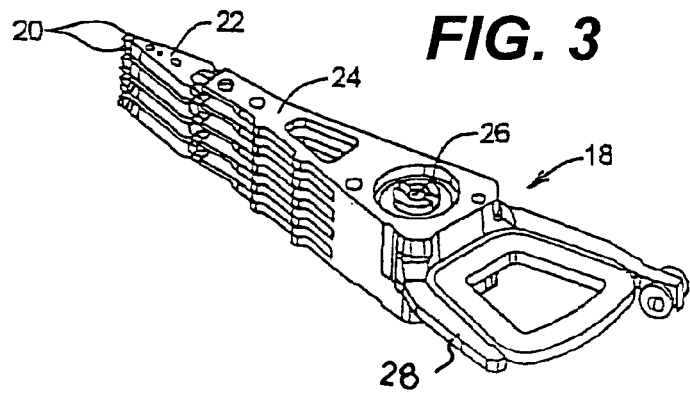
FIG. 3 is a perspective view of a portion of an actuator arm assembly having a plurality of actuator arms.

Referring now to the illustration of FIGS. 1 and 3, the actuator arm assembly 18 includes a plurality of the transducers 20, each of which are adjacent to a different one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Figure 4:
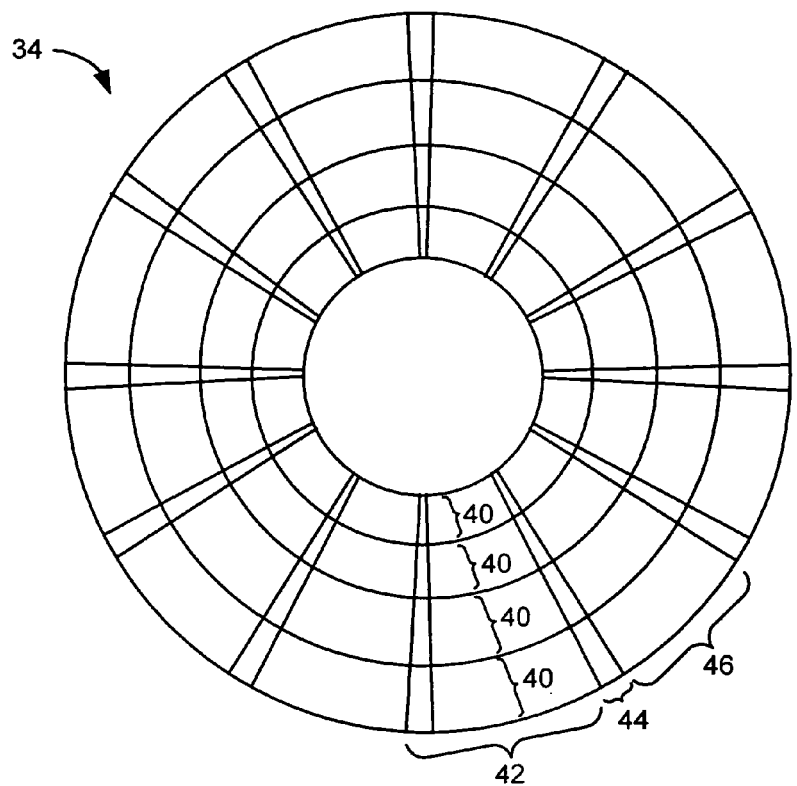
FIG. 4 is a top view of a disk and illustrates tracks and spokes, with each of the spokes being divided into a servo spoke and a data spoke.

FIG. 4 further illustrates one of the disks 34. Data is stored on the disk 34 within a number of concentric tracks 40 (or cylinders). Each track is divided into a plurality of radially extending sectors 42 on the disk 34. Each sector 42 is further divided into a servo region 44 and a data region 46. The servo regions 44 of the disk 34 are used to, among other things, accurately position the transducer 20 so that data can be properly written onto and read from the disk 34. The data regions 46 are where non-servo related data (i.e., data from host device/user) is stored and retrieved. Such data, upon proper conditions, may be overwritten. The data regions 46, or portions thereof, can be uniquely identified by block addresses. A host device can write data to and read data from the disk drive 10 by communicating respective write commands and read commands thereto that identify the associated block addresses on the disk 34 for the associated data storage/retrieval.

Figure 5:
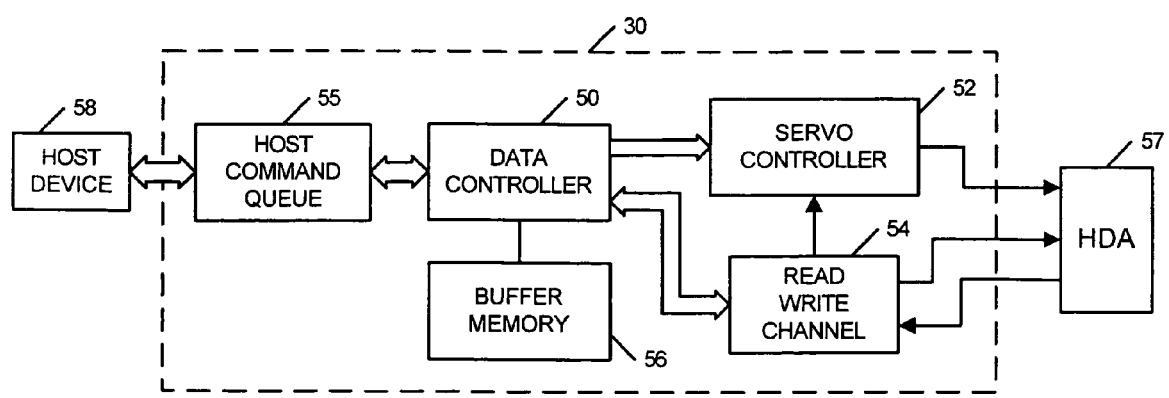
FIG. 5 is a block diagram of a portion of the controller of the disk drive shown in FIG. 1 according to some embodiments of the present invention.

Referring to FIG. 5, the controller 30 can include a data controller 50, a servo controller 52, a read/write channel 54, and an host command queue 55. The controller 30 may also include a buffer memory 56 in accordance with some embodiments of the present invention. The exemplary embodiment of the controller 30 has been illustrated with components that include two separate controllers 50,52, host command queue 55, read/write channel 54, and buffer memory 56 for purposes of illustration and discussion only. It is to be understood that the functionality that is described herein for one or more of those components may be consolidated in fewer components or distributed among more components.

The controller 30 is configured to respond to read and write commands from a host device 58 by reading and writing data on a head disk assembly (HDA) 57. The HDA 57 can include the actuator arm assembly 18, the disk stack 12, and the spindle motor 14. More particularly, read commands and write commands with associated block addresses from the host device 58 can be buffered in the host command queue 55. Data associated with the write commands can be buffered in the buffer memory 56. The data controller 50 can be configured to carry out a buffered write command in the host command queue 55 by formatting the associated data into blocks with the appropriate header information, and to transfer the formatted data from the buffer memory 56, via the read/write channel 54, to block addresses on the disk 34 that are identified by the write command. The data controller 50 can also be configured to carry out a buffered read command by reading, via the read write channel 54, data from block addresses on the disk 34 that are identified by the read command and to transfer the data to the host device 58.

The read/write channel 54 can operate in a conventional manner to convert data between the digital form used by the data controller 50 and the analog form conducted through the transducers 20 in the HDA 57. The read/write channel 54 provides servo positional information read from the HDA 57 to the servo controller 52. The servo positional information can be used to detect the location of the transducer 20 in relation to block addresses on the disk 34. The servo controller 52 can use block addresses from the data controller 50 and the servo positional information to seek the transducer 20 to an addressed track and block on the disk 34, and to maintain the transducer 20 aligned with the track while data is written/read on the disk 34. Accordingly, the data controller 50 and the servo controller 52 are collectively configured to carry out a write/read command by positioning the transducer 20 relative to block addresses on the disk 34 while writing/reading data on the disk 34.

Some embodiments of the present invention may arise from a recognition of an effect of temperature of the disk drive 10 on the quality of data written on the disk stack 12. From when a disk drive is initially powered on, the interior temperature of the disk drive 10 may increase, for example, 10° C. to 15° C. during the first 15 to 30 minutes of operation. Thereafter, the temperature may stabilize near a normal operating temperature. When data is written to the disk 34 while the disk drive 10 is cold (e.g., before it has reached a threshold operating temperature), weak or otherwise defective data may be recorded on the disk 34 due to, for example, an inability to generate sufficient write current from the read write channel 54 through the transducer 20 in the HDA 57. The magnetic field necessary to write data increases at low temperatures. This may require more write current than that which is available or that which is allowed by criteria which protect adjacent tracks from corruption by the writer fringe field.

In accordance with some embodiments of the present invention, the data controller 50 is configured to write an alternating pattern on a buffer portion of the disk 34 to erase data thereon. The data controller 50 determines whether the disk drive has reached a threshold operating temperature, and selectively directs data from the host device 58 to be written to the buffer portion of the disk 34 when the disk drive 10 has not reached the threshold operating temperature. The data controller 50 can later copy the data from the buffer portion of the disk to the original block address on the disk, and can then erase the data from the buffer portion of the disk. Accordingly, before the disk drive 10 has sufficiently warmed-up after power-on, the data controller 50 can write data from the host device 58 to a buffer portion of the disk 34 that has been erased, and it can later copy the data to the original block address(es) on the disk 34 when the disk drive 10 is determined to have sufficiently warmed-up. As will be described in further detail below, the data controller 50 can maintain parts of the buffer portion of the disk 34 in an erased condition and can write data on the buffer portion of the disk 34, which may provide improved data writes while the disk drive 10 is relatively cold.

Figure 6:
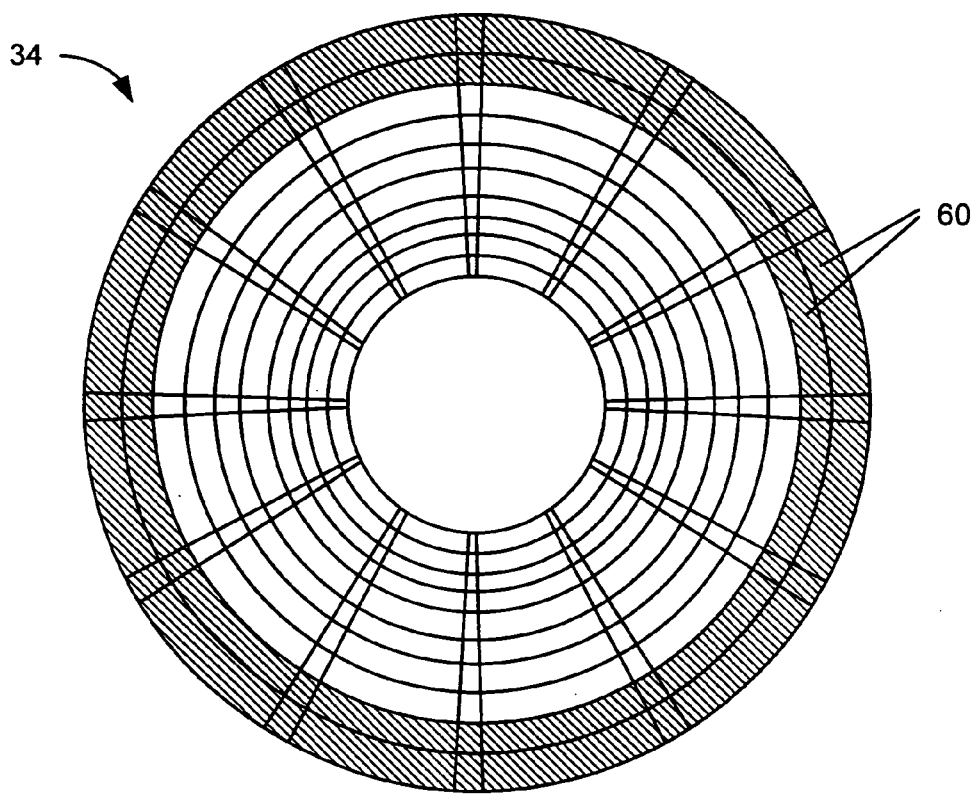
FIG. 6 is a top view of a disk and illustrates a buffer portion of the disk that is maintained in an erase state in accordance with some embodiments of the present invention.

FIG. 6 is a top view of one of the surfaces 36 of the disk 34, and illustrates an exemplary buffer portion 60 of the disk 34 that can be used to temporarily store data and associated original block addresses identified by an associated write command while the disk drive 10 is cold, and from which the data can then be copied to the associated original block addresses elsewhere on the disk 34. Although the buffer portion 60 has been illustrated as including two complete tracks for purposes of illustration only, it is to be understood that the buffer portion 60 can include any number of tracks or incomplete portions of one or more tracks. The number of block addresses and associated space on the disk 34 that is to be used as the buffer portion 60 may be defined based on an expected elapsed time for the disk drive 10 to reach a threshold operating temperature after power-up, and based on an amount of data that is expected to be written by the host device 58 to the disk drive 10 during that elapsed time.

Figure 7:
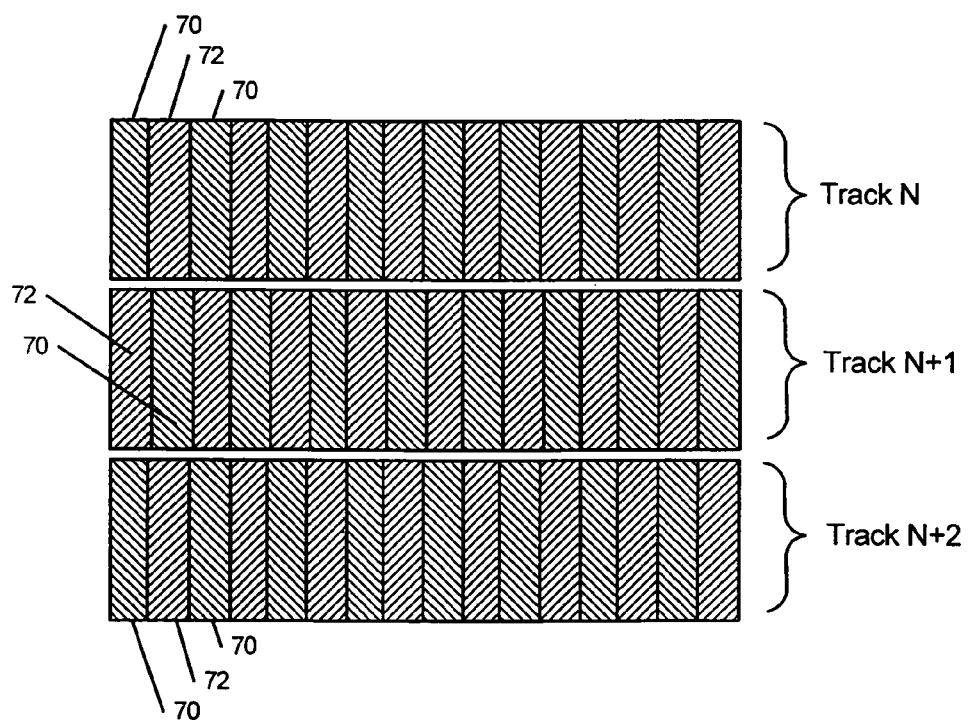
FIG. 7 illustrates in further detail a portion of three adjacent tracks in the buffer portion of the disk shown in FIG. 6, in accordance with some embodiments of the present invention.

The data controller 50 can maintain the buffer portion 60 in an erased condition by erasing data that may reside on a selected part of the buffer portion 60 before new data is written thereon. When the disk drive 10 is configured to perform longitudinal recording on the disk 34, the data controller 50 can erase data by causing an alternating current to be conducted through the transducer 20, via the read write channel 54, to write a pattern of alternating opposite polarity magnetic areas over the data. FIG. 7 illustrates in further detail a exemplary pattern of alternating magnetic areas 70, 72 along a portion of three adjacent tracks N, N+1, N+2 of buffer portion 60, in accordance with some embodiments of the present invention. The areas with cross-hatching from upper left to the lower right (i.e., areas 70) have a first magnetic bias polarity, while the pulses with cross-hatching from lower left to the upper right (i.e., areas 72) have a second magnetic bias polarity that is opposite to the first polarity. Accordingly, the magnetically biased areas can generally alternate polarity along each of the tracks N, N+1, N+2 in the buffer portion 60.

When the disk drive 10 is configured to perform perpendicular (vertical) recording on the disk 34, the data controller 50 can erase data from the buffer portion 60 with a DC write current that alternates polarity between adjacent tracks so that a plurality of even numbered tracks have an opposite DC magnetization to that of the odd numbered tracks between the plurality of even numbered tracks. Alternatively for perpendicular recording, the data controller 50 can erase data from the buffer portion 60 with a DC write current that writes a same polarity magnetic area over the data across a plurality of adjacent tracks. Alternatively for perpendicular recording, the data controller 50 can erase data from the buffer portion 60 by causing a direct current having a first polarity to be conducted through the transducer 20 to write a first polarity magnetic area over the data along one half of a track and to cause a direct current having a second polarity to be conducted through the transducer 20 to write a second polarity magnetic area over the data along the other half of the track, where the first polarity is opposite to the second polarity.

Accordingly, when the disk drive 10 has not reached a threshold operating temperature, data from the host device 58 can be written on a part of the buffer portion 60 that has been erased with the alternating opposite polarity magnetic areas 70,72. A larger residual portion of the alternating opposite polarity magnetic areas 70,72 may remain after data is recorded over the erased buffer portion 60 than may otherwise remain if the disk drive were above the threshold operating temperature. However, because the written part of the disk 34 was earlier erased, the recorded data may be more accurately read back and decoded by the data controller 50. For example, when the transducer 20 reads data from the buffer portion 60, the data portion of the read signal may be relatively weak with a noise component that arises when the magnetic areas 70,72 used for erasing are not completely overwritten. However, because the magnetic areas 70,72 form a pattern of alternating opposite magnetic polarities, the resulting noise can be uncorrelated with the data component of the signal. The noise may thereby be more easily removed by subsequent signal processing by the data controller 50.

The data controller 50 may detect and correct data bits in the read signal using, for example, a Viterbi, a maximum a posteriori, or other type of detector and/or an error correction decoder. Such detection and error correction may be more accurately carried out when the data is written on an area of the disk 34 that has been erased with the pattern of alternating opposite magnetic polarity areas 70,72.

In some further embodiments, the data controller 50 causes the buffer portion 60 to be erased using a higher alternating frequency write current than is used to write data thereon. Accordingly, the length of a data bit written along a track can be greater than the length of each of the alternating areas 70,72. When the alternating areas 70,72 are incompletely overwritten with data, and each data bit is at least twice as long as each of the areas 70,72, the noise component in the read signal due to residual portions of the alternating areas 70,72 has a higher frequency than the data component thereof. The higher frequency noise component in the read signal may be more easily identified and compensated for by the data controller 50.

The magnetic polarity of radially aligned areas 70,72 of radially adjacent tracks in the buffer portion 60 can be written to have opposite magnetic polarity to one another. As used herein, the areas 70, 72 are radially aligned when they are substantially aligned in a direction between an outer and inner periphery of the disk. For example, as shown in FIG. 7, the magnetic areas 70 of track N+1 are radially aligned with the opposite polarity magnetic areas 72 of tracks N and N+2, which are on opposite radially adjacent sides of track N+1. Likewise, the magnetic areas 72 of track N+1 are radially aligned with the opposite polarity magnetic areas 70 of tracks N and N+2. Interleaving the magnetic polarity of the radially adjacent tracks may improve the ability of the data controller 50 to identify and compensate for noise that is induced into the read signal when the transducer 20 is sufficiently off-track to read a portion of an adjacent track.

The controller 30 may cause data from the host device 58 to be written to the buffer portion 60 of the disk 34 at a radial track density that is less than that at which data is written on other portions of the disk 34. The radial track density may be decreased by increasing the spacing between adjacent track centerlines. The radial track density may alternatively or additionally be increased by skipping one or more tracks between tracks on which data can be written. For example, with reference to FIG. 7, the data controller 50 may write data onto tracks N and N+2, but may reserve track N+1 therebetween as a buffer track on which data is not written. When the radial track density in the buffer portion 60 is decreased, the write current that is used to write data thereon can be increased while avoiding or reducing the effect of adjacent track erasure on adjacent tracks. Accordingly, before the disk drive reaches the threshold operating temperature, data may be written with a higher average write current on the buffer portion 60 than may be used to write data to block addresses outside of the buffer portion 60. The controller 30 may additionally, or alternatively cause data from the host device to be written to the buffer portion 60 of the disk 34 at a bit density that is less than that at which data is written on other portions of the disk 34.

FIGS. 8–15 are flowcharts of operations that may be carried out by the controller 30 and, more particularly, by the data controller 50 in accordance with various different embodiments of the present invention.

Figure 8:
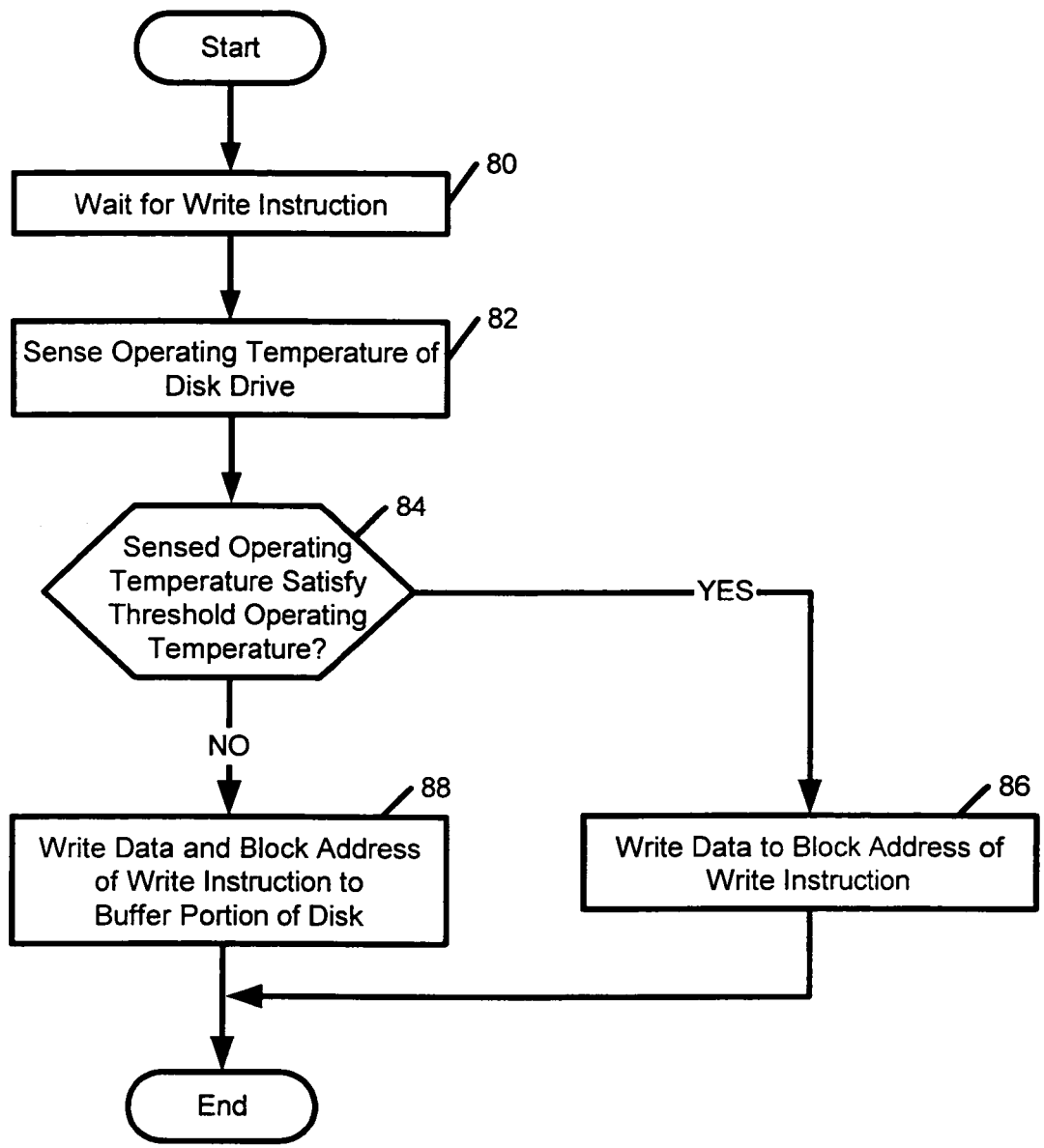
FIG. 8 is a flowchart showing operations for writing data selectively to the buffer portion or elsewhere on the disk responsive to temperature of the disk drive in accordance with some embodiments of the present invention.

FIG. 8 is a flowchart of operations that may be carried out to write data selectively to a buffer portion of the disk 34 or elsewhere responsive to the operating temperature of the disk drive 10. After power-up of the disk drive 10, or awaking from a sleep state (i.e., a state in which the operating temperature can sufficiently drop to effect writes that occur thereafter), operation waits at Block 80 for receipt of a write command from the host device 58.

The operating temperature of the disk drive 10 is sensed at Block 82, and a decision is made at Block 84 as to whether the sensed operating temperature satisfies (e.g., exceeds) a threshold operating temperature. Whether the operating temperature satisfies the threshold temperature may be determined by writing data, which may be a test pattern or data from the host device 58, to various portions of the disk 34, and verifying the accuracy of the recorded data. When the data recorded on the disk 34 contains a threshold number of errors, the disk drive 10 may be determined to have not reached the threshold operating temperature. Similarly, when the recorded data contains less than the threshold number of errors, the disk drive 10 may be determined to have at least reached the threshold operating temperature. The determination of whether the disk drive 10 has reached the threshold operating temperature may also be made by determining when a threshold time has elapsed since the disk drive 10 was powered-up/awaken, and/or by monitoring a temperature sensor that can sense an ambient temperature near the disks 34, the controller 30, and/or the transducers 20 and/or a surface temperature of one or more components of the disk drive 10.

When the operating temperature of the disk drive 10 is determined to have not reached the threshold operating temperature, then at Block 88, the data and block address identified by the write command are written to a buffer portion of the disk 34. In contrast, when the operating temperature has reached the threshold operating temperature, then at Block 86, the data is written to the block address of the disk 34 identified by the write command. A directory of the write commands to the buffer portion of the disk is maintained in the write buffer memory 56 so that read commands from the host will be directed to the appropriate region of the disk.

Figure 9:
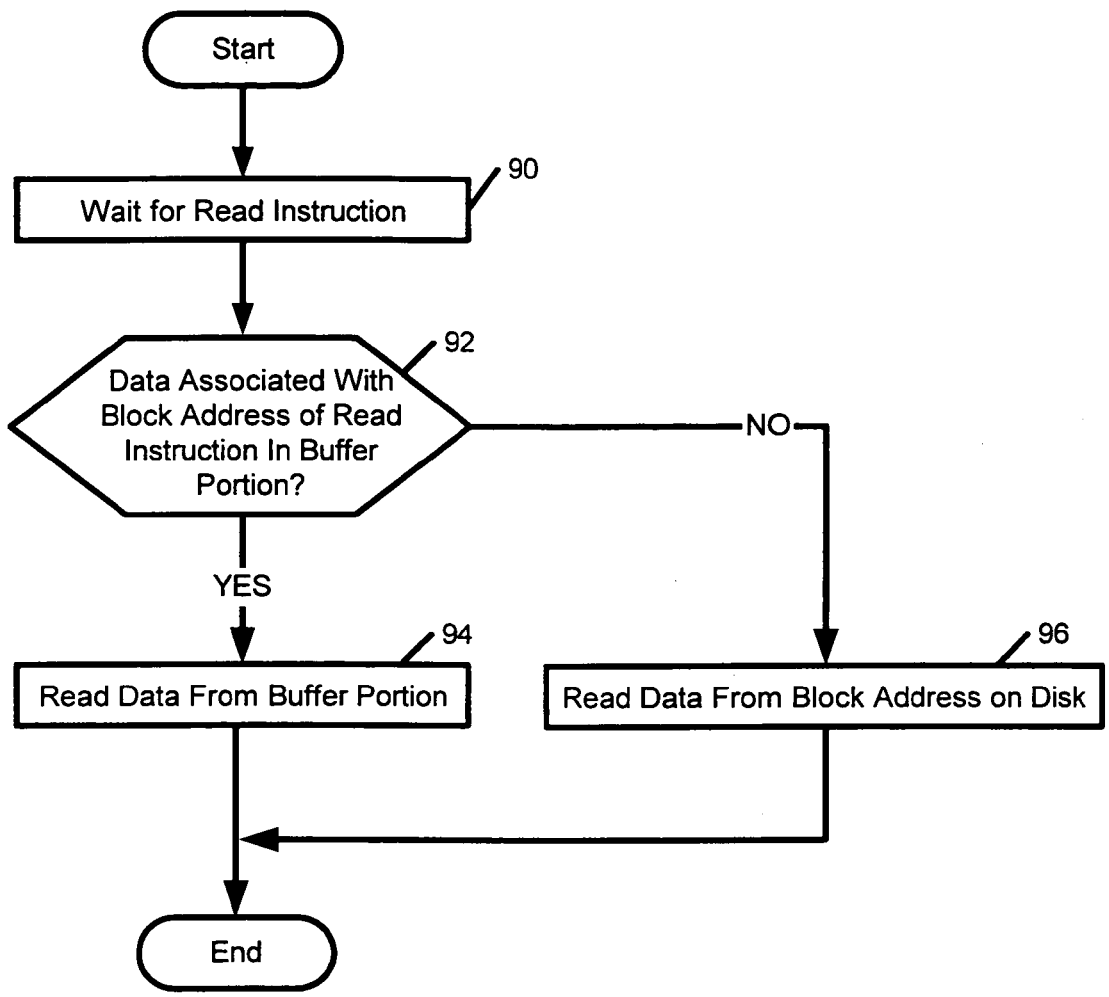
FIG. 9 is a flowchart showing operations for reading data selected from the buffer portion or elsewhere on the disk in accordance with some embodiments of the present invention.

FIG. 9 is a flowchart of operations that may be carried responsive to a read command from the host device 58 by reading the requested data from the buffer portion of the disk 34 when it is present therein, and otherwise reading the requested data from the identified block address elsewhere on the disk 34. At Block 90, operation waits for receipt of a read command. A decision is made at Block 92 as to whether the data associated with the block address from the read command is in the buffer portion by searching the directory in the write buffer memory 56, and, when it is, the data is read at Block 94 from the buffer portion and communicated to the host device 58. Otherwise, the data is read at Block 96 from the block address identified by the read command elsewhere on the disk 34 and communicated to the host device 58.

Figure 10:
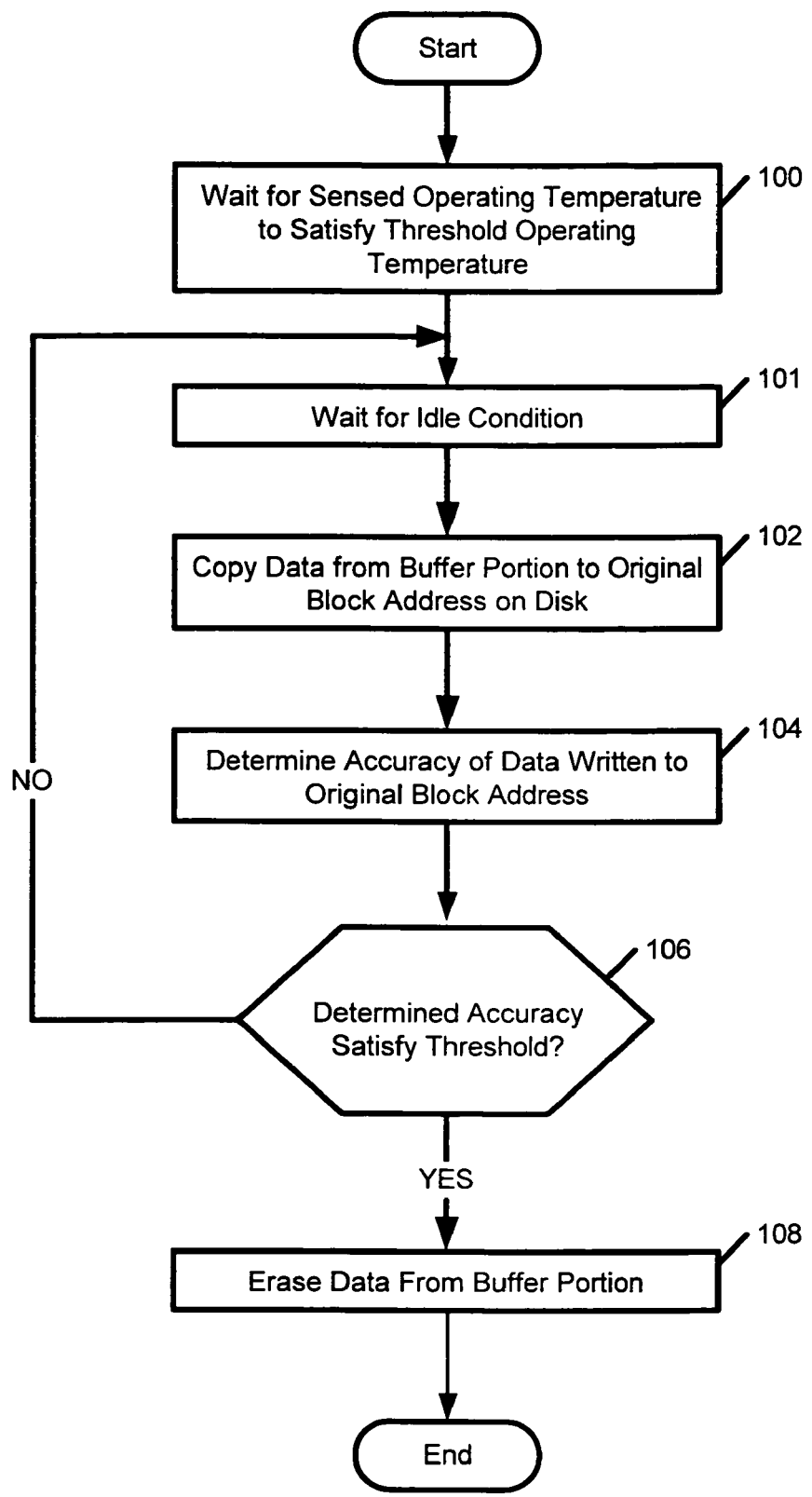
FIG. 10 is a flowchart showing operations for copying data from the buffer portion to elsewhere on the disk in accordance with some embodiments of the present invention.

FIG. 10 is a flowchart of operations that may be carried out to copy data from the buffer portion of the disk 34 to the original block address identified by the earlier associated write command. Operation waits at Block 100 until the sensed operating temperature satisfies (e.g., exceeds) the threshold operating temperature. Operation may further wait at Block 101 until no read commands and/or write commands are pending in the host command queue 55. Accordingly, copying of the data from the buffer portion of the disk 34 may be carried out as a background task when the disk drive 10 is not waiting to perform a pending read/write command.

At Block 102, data is copied from the buffer portion of the disk 34 to the original block address identified by the earlier associated write command. At Block 104, the accuracy of the data recorded at the original block address is determined. When the determined accuracy does not satisfy a threshold accuracy (e.g., excessive errors) at Block 106, operation loops back to Block 101 to again copy the data from the buffer portion of the disk 10. When the determined accuracy satisfies the threshold accuracy at Block 106, the data is then erased at Block 108 from the buffer portion of the disk 34. Because the data is erased after the disk drive 10 has been determined to have warmed-up, the data will be more completely erased than will otherwise occur if the data were erased while the disk drive 10 was relatively cold.

Figure 11:
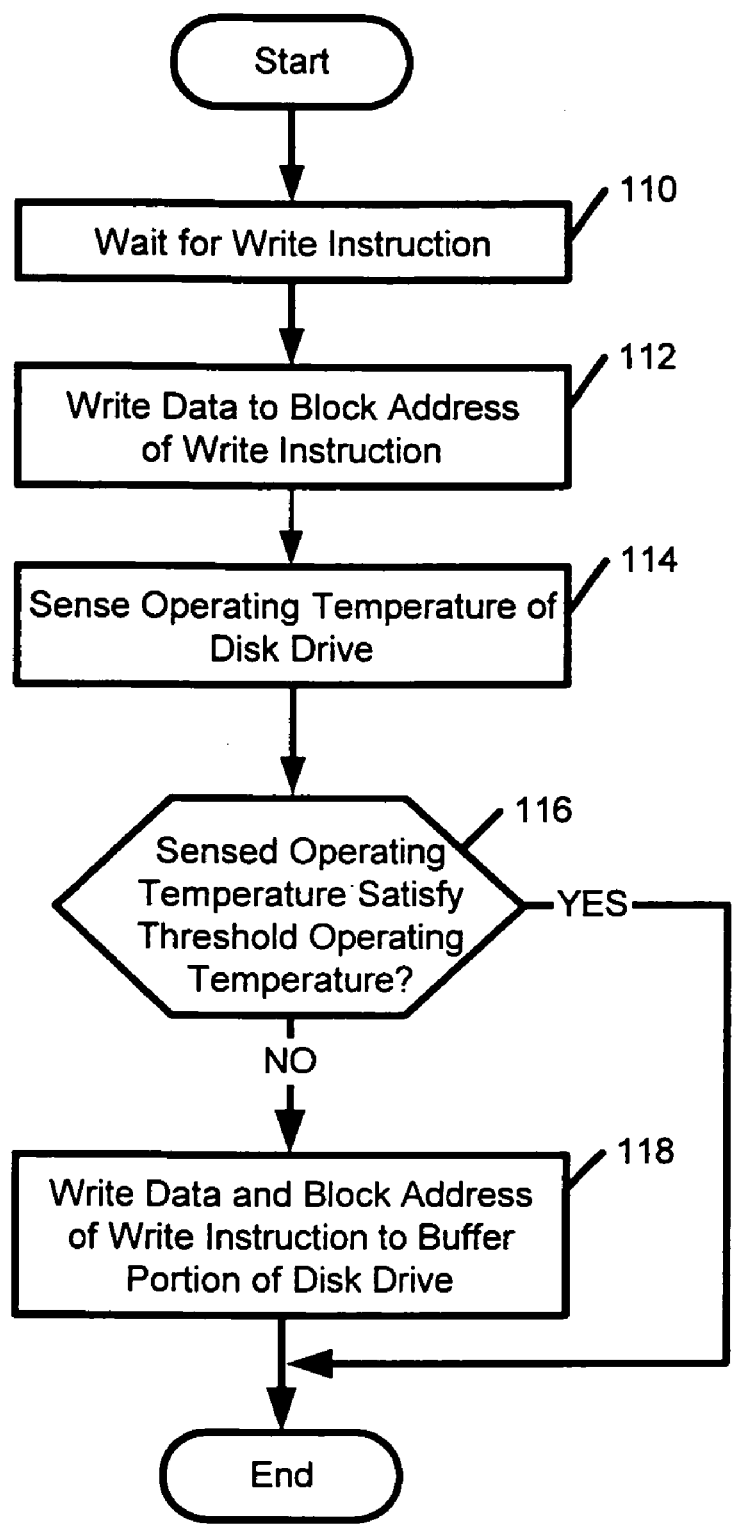
FIG. 11 is a flowchart showing operations for writing data to a block address of a write command, and selectively writing the data to the buffer portion of the disk responsive to the temperature of the disk drive, in accordance with some embodiments of the present invention.

FIG. 11 is a flowchart of operations for writing data to a block address identified by a write command, and selectively writing the data to the buffer portion of the disk responsive to the temperature of the disk drive. After power-up of the disk drive 10, or awaking from a sleep state, operation waits at Block 110 for receipt of a write command from the host device 58. Operation may also wait until no read commands and/or write commands are pending in the host command queue 55 (such as described for Block 101). The data is written at Block 112 to the block address identified by the write command. The operating temperature of the disk drive 10 is sensed at Block 114, and a decision is made at Block 116 as to whether the sensed operating temperature satisfies (e.g., exceeds) a threshold operating temperature. When the operating temperature of the disk drive 10 is determined to have not reached the threshold operating temperature, then at Block 118, the data and block address from the write command are written to a buffer portion of the disk 34. Accordingly, when the operating temperature has reached the threshold operating temperature, the data is only written to the identified block address, and when the operating temperature has not reached the threshold operating temperature then the data is written to both the identified block address and the buffer portion of the disk.

Figure 12:
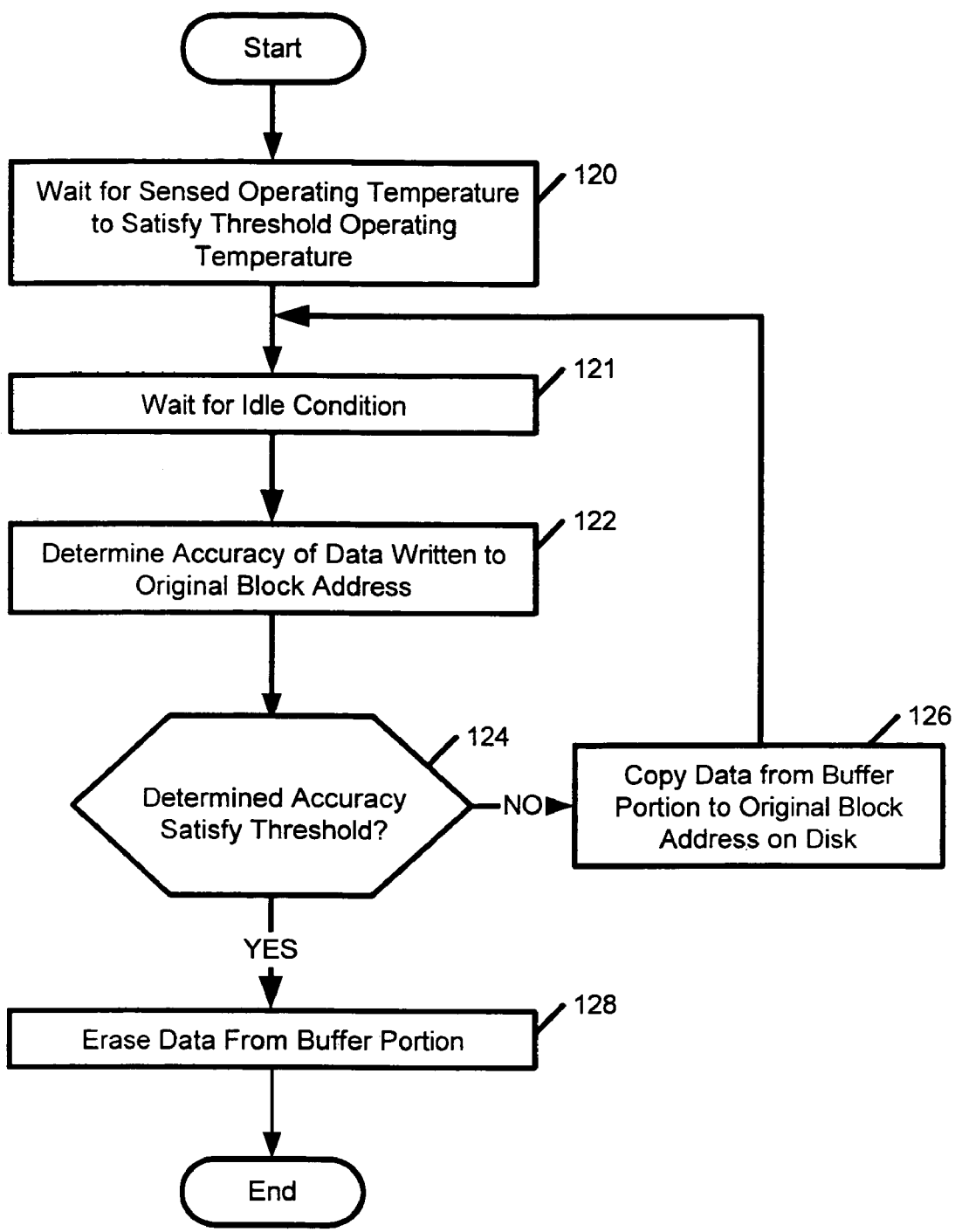
FIG. 12 is a flowchart showing operations for rewriting data that contains errors using data from the buffer portion of the disk in accordance with some embodiments of the present invention.

FIG. 12 is a flowchart of operations that may be carried out to verify that the data recorded at the block address identified by the earlier write command was written correctly, and, if not, to correct errors. Operation waits at Block 120 until the sensed operating temperature satisfies (e.g., exceeds) the threshold operating temperature. Operation may further wait at Block 121 for an idle condition (i.e., no read commands and/or write commands pending in the host command queue 55). The accuracy of the data recorded at the identified block address is determined at Block 122. A decision is made at Block 124 as to whether the determined accuracy satisfies an accuracy threshold (e.g., less than a threshold number of errors), and, if not, then at Block 126 the data is copied again from the buffer portion to the original identified block address. Otherwise, when the determined accuracy satisfies the threshold at Block 124, then at Block 128, the data is erased from the buffer portion of the disk 34. The recorded data may alternatively, or additionally, be verified in response to a read command from the host device 58.

Figure 13:
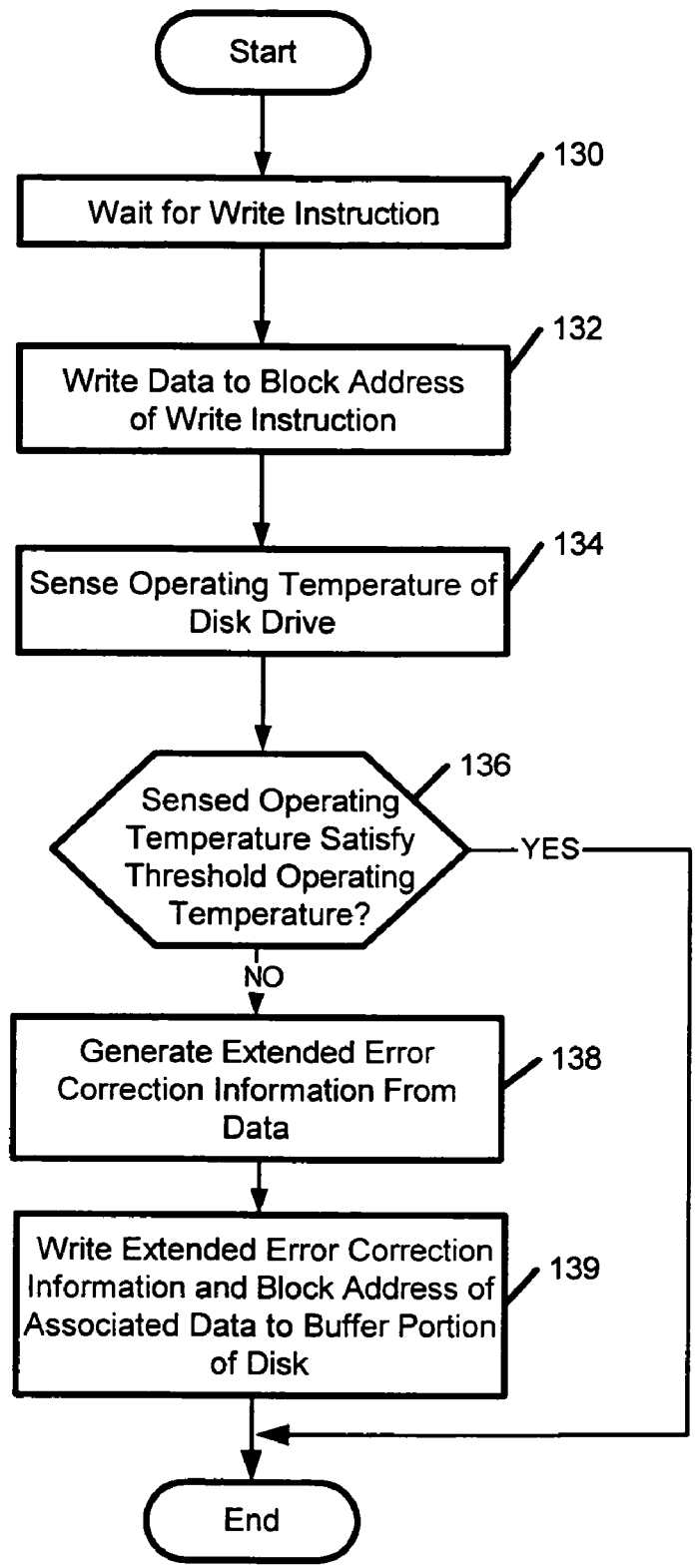
FIG. 13 is a flowchart showing operations for determining extended error correction information for data that is to be written to the disk, and selectively writing the extended error correction information to the buffer portion responsive to the temperature of the disk drive in accordance with some embodiments of the present invention.

FIG. 13 is a flowchart of operations that may be carried out to write data to the block address identified by the write command and, when the disk drive has not sufficiently warmed-up, to also write extended error correction information to the buffer portion of the disk 34. The extended error correction information enables detection and correction of more errors in the data than error correction information that is generated and encoded within data blocks that are written to the disk 34. After power-up of the disk drive 10, or awaking from a sleep state, operation waits at Block 130 for receipt of a write command from the host device 58. Operation may also wait until no read commands and/or write commands are pending. At Block 132, the data is written to the block address identified by the write command.

The operating temperature of the disk drive 10 is sensed at Block 134, and a decision is made at Block 136 as to whether the sensed operating temperature satisfies (e.g., exceeds) a threshold operating temperature. When the operating temperature of the disk drive 10 is determined to have not reached the threshold operating temperature, then at Block 138 extended error correction information is generated. The extended error correction information contains additional information beyond that which is used to encode the data, and which can be stored in the buffer portion and later used to provide more robust error correction of read data as will be described below. At Block 139, the extended error correction information and the block address of the associated data are written to the buffer portion of the disk 34. Accordingly, the data is written to the block address identified by the write command irrespective of the sensed operating temperature. However, when the operating temperature has not yet reached the threshold operating temperature, the extended error correction information is written to the buffer portion of the disk 34 where it can be later used to correct errors in the data that is read in response to a write command.

Figure 14:
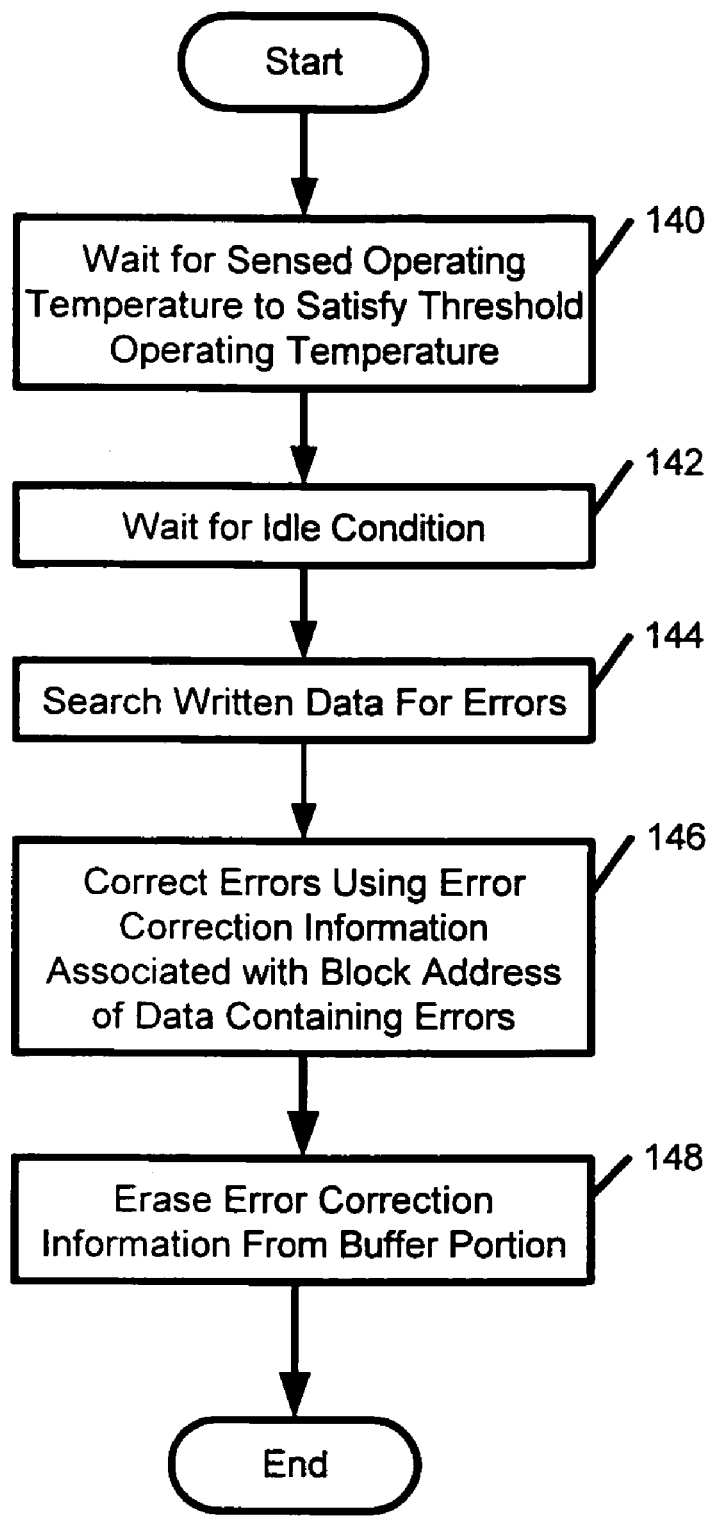
FIG. 14 is a flowchart showing operations for attempting to correct errors in written data using extended error correction information from the buffer portion of the disk in accordance with some embodiments of the present invention.

FIG. 14 is a flowchart of operations that may be carried out to verify that the data recorded at the block address identified by the earlier write command was written correctly, and, if not, to correct errors. Operation waits at Block 140 until the sensed operating temperature satisfies (e.g., exceeds) the threshold operating temperature. Operation may also wait at Block 142 until no read commands and/or write commands are pending. The data recorded at the block address identified by the earlier write command is searched at Block 144 for errors that cannot be corrected only with the normal error correction data encoded with the data, and, when these uncorrectable errors are identified, they are corrected at Block 146 using the extended error correction information that was written to the buffer portion of the disk 34 (such as by operation 138 of FIG. 13) and which is associated with the block address of the data containing the errors. The extended error correction information can then be erased at Block 148 from the buffer portion of the disk 34.

Figure 15:
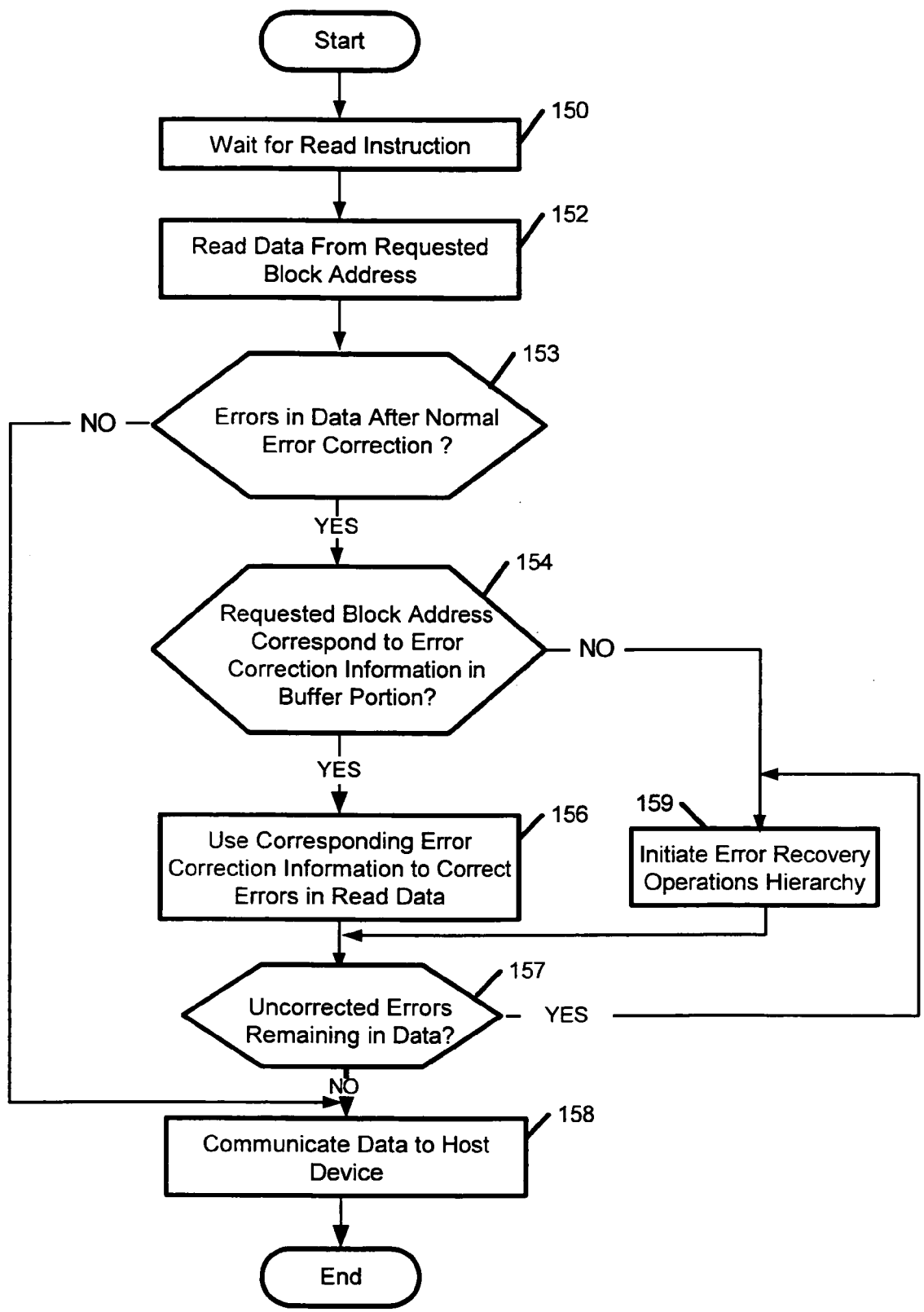
FIG. 15 is a flowchart showing operations for attempting to correct errors in data that is read in response to a read command using extended error correction information from the buffer portion of the disk, in accordance with some embodiments of the present invention.

FIG. 15 is a flowchart of operations that may be carried out to correct errors in data using extended error correction information that was written to the buffer portion of the disk 34. Operation waits at Block 150 for a read command from the host device 58. Data is read at Block 152 from a block address identified by the read command. At Block 153, an attempt is made to decode the data using its normal error correction information that is encoded with the read data. A decision is made at Block 153 as to whether errors remain in the data after normal error correction is carried out on the data using error correction information that is encoded within the data. When errors remain, then the directory in the write buffer memory 56 is examined for the existence of extended error correction information in the disk buffer 60. If there is no extended error correction information then the operations jump to Block 159 where a more time consuming hierarchy of error recovery techniques are carried out in a further attempt to correct errors in the data. The hierarchy of error recovery techniques at Block 159 may include repeated reads of the data with variable off-sets or other modifications to the read process that may improve the data recovery. In contrast, if extended error correction information is identified at Block 154 in the buffer portion of the disk 34, then operations proceed to Block 156 where the extended error correction information is read from the buffer portion of the disk 34 and used in a further attempt to correct errors in the data. At Block 157 a decision is made as whether the data can be decoded without error (i.e., decide whether all errors in the data been correct). If no errors remain in the data, then the data is communicated to the host device 58 at Block 158. Otherwise, if uncorrected error(s) remain in the data then the operations proceed to Block 159 which continues with the, or initiates a new, hierarchy of error recovery techniques.

The host command queue 55 may be set to a disabled state by, for example, a command from the host device 58 and/or a jumper that may be toggled by a user on an electrical interface of the disk drive 10. In some conventional disk drives, the host command queue 55 may be disabled to avoid losing any buffered write commands if the disk drive were to lose power before completion of buffered instructions. In such a conventional disk drive, when the host command queue is disabled it is effectively removed from a data path between the host device 58 and a data controller. Accordingly, the host device 58 must wait for the data controller to acknowledge completion of a pending write command before it can send another instruction to the conventional disk drive.

In accordance with some embodiments of the present invention, when the host command queue 55 is set to a disabled state, a write command from the host device 58 is both stored in the host command queue 55 and written to the buffer portion 60 of the disk 34. After the write command is written to the buffer portion 60 of the disk 34, the data controller 50 can generate a signal to the host device 58 that indicates completion of the write command. The host device 58 may thereafter immediately send another read/write command. A plurality of the write commands from the host device 58 may be quickly written to the buffer portion 60 of the disk 34 compared to the time needed to carry out the write commands to the original block addresses identified therewith, because the written instructions may be written along a contiguous area of the buffer portion 60 without necessitating seek operations or with relative short seek operations.

Figure 16:
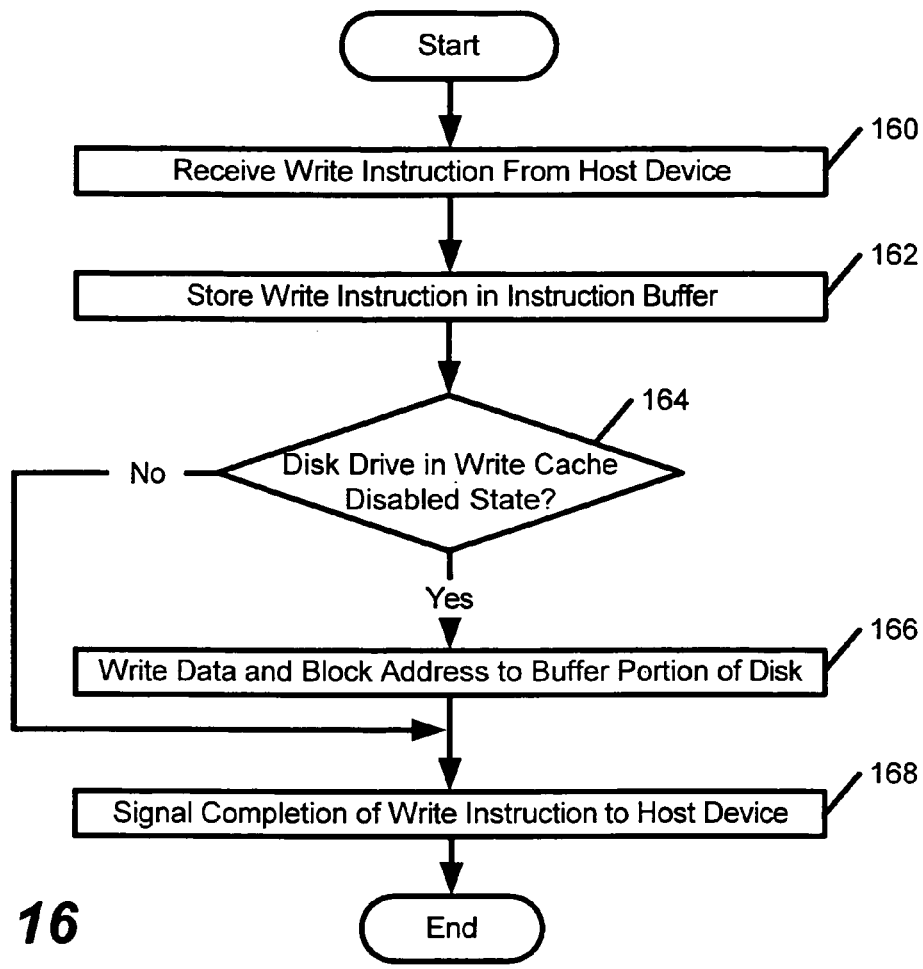
FIG. 16 is a flowchart showing operations for selectively storing write commands on a buffer portion of the disk responsive to whether the host command queue is set to a disabled state, in accordance with some embodiments of the present invention.

FIG. 16 is a flowchart that shows operations that may be carried out by the controller 30 and, more particularly, by the data controller 50 to selectively store write commands from the host device 58 in the buffer portion 60 of the disk 34 based on whether the disk drive 10 is set to a first state where notification of a write command completion indicates that the write data has been written to the destination block address or is set to a second state where notification of a write command completion indicates that write data has been received by the disk drive into the buffer memory 56 but does not indicate whether the data has been written to the destination block address. The second data is referred to herein as a "write cache enabled" state. A write command is received from the host device 58 at Block 160. The write command is stored in the host command queue 55 at Block 162. A decision is made at Block 164 as to whether the disk drive 10 is set to the write cache enabled state. If not, the data associated with the command is written to the buffer portion 60 of the disk 34 at Block 166. Writing the data for successive write commands to the buffer portion 60 of the disk 34 obviates the delays associated with the mechanical motion needed to write the data to the various destination block addresses specified by the commands. At Block 168, a signal is generated from the disk drive 10 to the host device 58 that indicates that the write command has been completed, which can trigger the host device 58 to immediately send another read/write command to the disk drive 10.

Figure 17:
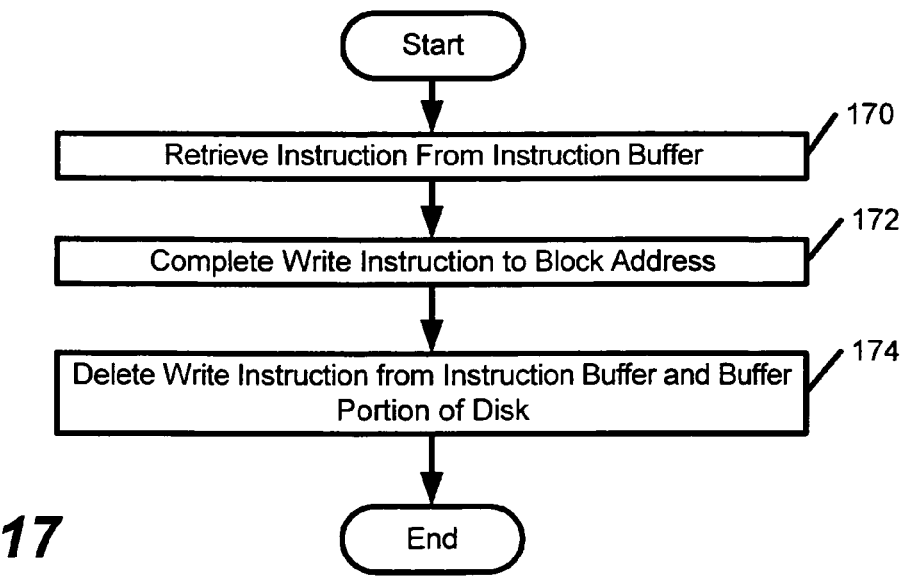
FIG. 17 is a flowchart showing operations for completing instructions in the host command queue and removing completed instructions from the host command queue and the buffer portion of the disk, in accordance with some embodiments of the present invention.

FIG. 17 is a flowchart showing operations for completing instructions in the host command queue. Instructions that are queued in the host command queue 55 are retrieved at Block 170 and completed at Block 172. At Block 174, the completed write command is deleted (flushed) from the host command queue 55 and the corresponding copy of the write command in the buffer portion 60 of the disk 34 is erased. Although the exemplary operations of Blocks 170–174 indicate that each write command is deleted from the host command queue 55 and buffer portion 60 of the disk 34 after being completed, instead all or a defined group of buffered instructions may be collectively deleted after being completed. Moreover, the operations of Blocks 170–174 of retrieving, completing, and erasing buffered write commands may be delayed so that they are carried out during an idle time between receipt of read/write commands from the host device 58 and/or when a cumulative size of the buffered instructions exceeds a threshold size (i.e., when the host command queue 55 becomes full).

Accordingly, when the host command queue 55 is set to a disabled state, the write command is both stored in the host command queue 55 and written to the buffer portion 60 of the disk 34. Consequently, although the host command queue 55 is used while it is set to a disabled state, if the disk drive 10 loses power then any write commands that are lost from the host command queue 55 can be recovered from the buffer portion 60 of the disk 34, as will be discussed below with regard to FIG. 18.

Figure 18:
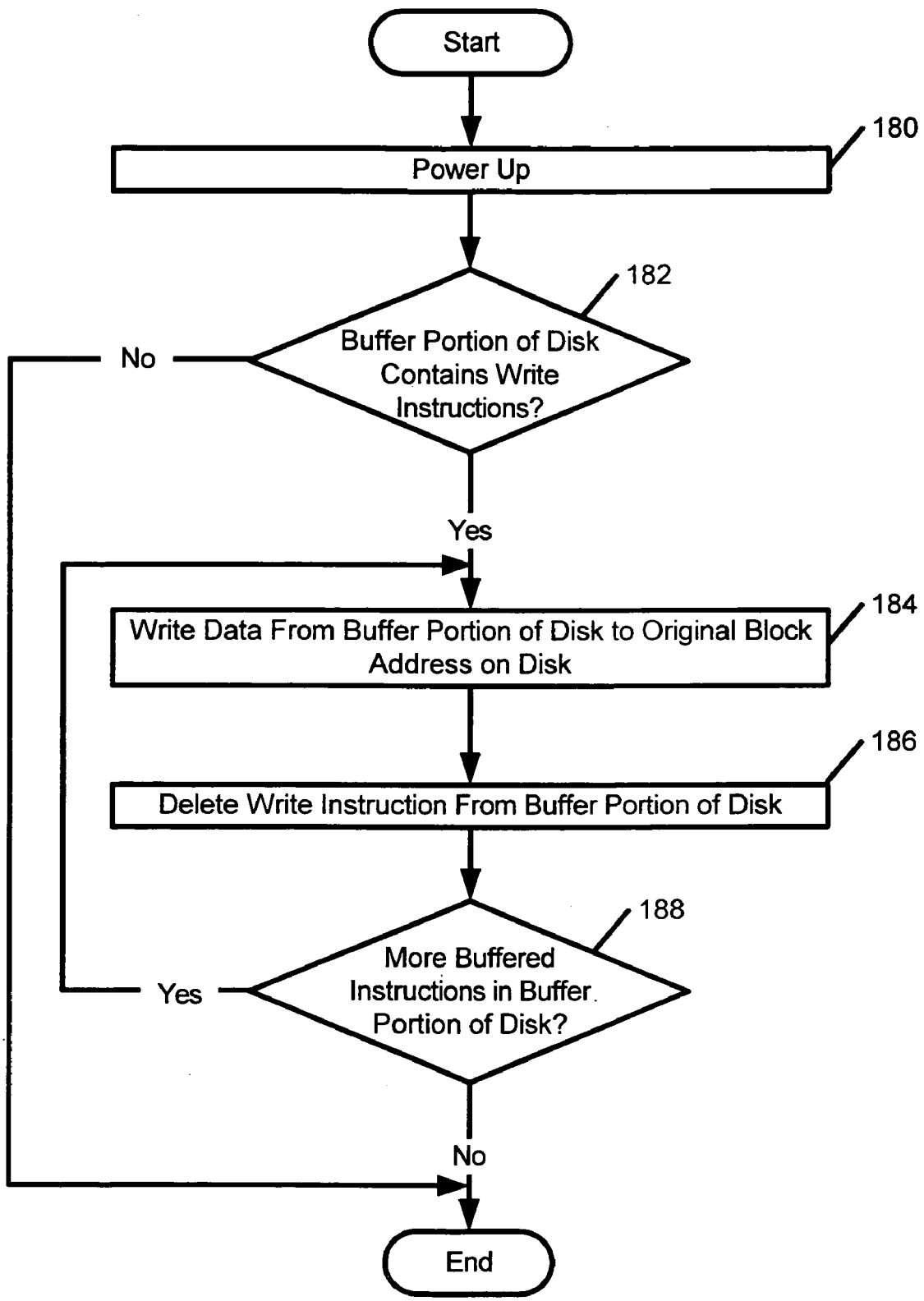
FIG. 18 is a flowchart showing operations for recovering write commands from the buffer portion of the disk which were not completed in the host command queue before loss of power to the disk drive, in accordance with some embodiments of the present invention.

FIG. 18 is a flowchart that shows operations for recovering write commands from the buffer portion 60 of the disk 34 which were lost from the host command queue 55 before they were completed because of loss of power to the disk drive 10. Power up of the disk drive 10 is identified at Block 180. A decision is made at Block 182 as to whether the buffer portion 60 of the disk 34 contains any write commands, indicating that one or more write commands were lost from the host command queue 55 before completion. When one or more write commands are present, then at Block 184 data associated with a first one of the write commands is written from the buffer portion 60 to the original block address on the disk 34. The completed instruction is deleted from the buffer portion 60 at Block 186. A decision is made at Block 188 as to whether another instruction is present in the buffer portion 60 and, if so, then the operations of Blocks 184 ad 186 are repeated until the instructions in the buffer portion 60 are all completed.

The amount of space on the disk 34 that is allocated for the buffer portion 60 can be defined based on the memory size of the host command queue 55. For example, the size of the buffer portion 60 can be sufficient to store at least the maximum number of instructions that can be buffered in the host command queue 55.

In some other embodiments of the present invention, some of the operations/acts that have been described above as being carried out to a buffer portion of the disk 34, may instead be carried out to the buffer memory 56 shown in FIG. 5. The buffer memory can include one or more integrated circuit memories, and may be a semiconductor memory and/or a magnetic memory, such as an electrically erasable programmable read only memory (EEPROM), a flash EPROM, and/or a battery backed random access memory. Accordingly, with reference to FIG. 8, the data and block address from the write command may be written to the buffer memory 56 at Block 88. Referring to FIG. 9, at Block 92, the decision at Block 92 can determine whether the data associated with the block address identified by the read command resides in the buffer memory 56 and, if so, then at Block 94 the data can be read from the buffer memory 56 and communicated to the host device 58. Referring to FIG. 10, at Block 102, the data can be copied from the buffer memory 56 to the original block address on the disk 34. The operation at Block 108 may be eliminated, unless if erasure of the buffer memory 56 is preferably performed before a write operation thereto.

In some further embodiments, with reference to Block 118 of FIG. 11, the data and block address from the write command may be written to the buffer memory 56. The data may then be copied at Block 126, in FIG. 12, from the buffer memory 56 to the original block address on the disk 34.

In some further embodiments, with reference to Block 138 of FIG. 13, the extended error correction information and associated block address of the associated data can be written at Block 138 to the buffer memory 56. The extended error correction information can then be used at Block 146 in FIG. 14 to correct errors in data that was written to the disk 34 before the disk drive 10 had reached the threshold operating temperature. The extended error correction information in the buffer memory 56 may also be used to correct errors at Block 156 in FIG. 15 in data that is read responsive to a read command from the host device 58.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
   a rotatable data storage disk;
   a transducer that is configured to read and write data on the disk;
   an actuator that is configured to position the transducer relative to defined portions of the disk; and
   a controller that is configured to write a predetermined magnetic polarity pattern on a buffer portion of the disk to erase data thereon, to determine whether the disk drive has reached a threshold operating temperature, to selectively direct data from a host device, which is addressed for an associated original block address on the disk, to be written to the buffer portion of the disk when the disk drive is determined to have not reached the threshold operating temperature, to copy the data from the buffer portion of the disk to the original block address on the disk, and to erase the data from the buffer portion of the disk after the data is copied to the original block address.

2. The disk drive of claim 1, wherein the controller is further configured to erase data from the buffer portion of the disk by causing an alternating current to be conducted through the transducer to write a pattern of alternating opposite polarity magnetic areas over the data.

3. The disk drive of claim 2, wherein the controller is further configured to write data bits on the disk each with a first length, and to erase data from the buffer portion of the disk by writing alternating opposite polarity magnetic areas each with a second length, wherein the first length is larger than the second length.

4. The disk drive of claim 1, wherein the controller is further configured to erase data from the buffer portion of the disk by causing a direct current to be conducted through the transducer to write a same polarity magnetic area over the data across a plurality of adjacent tracks.

5. The disk drive of claim 1, wherein the controller is further configured to erase data from the buffer portion of the disk by causing a direct current having a first polarity to be conducted through the transducer to write a first polarity magnetic area over the data in a plurality of even numbered tracks and to cause a direct current having a second polarity to be conducted through the transducer to write a second polarity magnetic area over the data in odd numbered tracks between the plurality of even numbered tracks, wherein the first polarity is opposite to the second polarity.

6. The disk drive of claim 1, wherein the controller is further configured to erase data from the buffer portion of the disk by causing a direct current having a first polarity to be conducted through the transducer to write a first polarity magnetic area over the data along one half of a track and to cause a direct current having a second polarity to be conducted through the transducer to write a second polarity magnetic area over the data along the other half of the track, wherein the first polarity is opposite to the second polarity.

7. The disk drive of claim 1, wherein the magnetic polarity of radially aligned areas of radially adjacent tracks in the buffer portion of the disk have opposite magnetic polarity to one another.

8. The disk drive of claim 1, wherein the controller is further configured to write the data from the host device to the buffer portion of the disk at a first radial track density, and to write the data from the buffer portion of the disk to the original block address on the disk at a second radial track density, wherein the first radial track density is less than the second radial track density.

9. The disk drive of claim 8, wherein the controller is further configured to cause a higher average write current through the transducer when writing data to the buffer portion of the disk than when writing data from the buffer portion of the disk to the original block address on the disk.

10. The disk drive of claim 1, wherein the controller is further configured to reserve at least one track between adjacent tracks in the buffer portion of the disk on which data is not written.

11. The disk drive of claim 10, wherein the controller is further configured to cause a higher average write current through the transducer when writing data to the buffer portion of the disk than when writing data from the buffer portion of the disk to the original block address on the disk.

12. The disk drive of claim 1, wherein the controller is further configured to write the data from the host device to the buffer portion of the disk at a first bit density along a track, and to write the data from the buffer portion of the disk to the original block address on the disk at a second bit density along a track, wherein the first bit density is less than the second bit density.

13. The disk drive of claim 1, wherein the controller is further configured to selectively direct the data from the host device to be written to the buffer portion of the disk responsive to when the disk drive is determined to have not reached the threshold operating temperature, and to be written to the original block address on the disk responsive to when the disk drive is determined to have reached the threshold operating temperature.

14. The disk drive of claim 1, wherein the controller is further configured to direct the data from the host device to be written to both the buffer portion of the disk and to the original block address on the disk responsive to when the disk drive is determined to have not reached the threshold operating temperature, and to write the data to only the original block address on the disk responsive to when the disk drive is determined to have reached the threshold operating temperature.

15. The disk drive of claim 1, wherein the controller is further configured to respond to a read command from a host device that requests data from a referenced block address by retrieving data referenced by the read command from the buffered portion of the disk responsive to when the referenced data resides thereon, and by retrieving the referenced data from the referenced block address on the disk responsive to when the referenced data does not reside on the buffered portion of the disk.

16. The disk drive of claim 1, wherein the controller is further configured to direct the data from the host device to be written to both the buffer portion of the disk and to the original block address on the disk, to determine an accuracy of the data written at the original block address, and to write the data from the buffer portion of the disk to the original block address responsive to when the determined accuracy is above a threshold accuracy.

17. The disk drive of claim 1, wherein the controller is further configured to write the data from the host device and the associated original block address to the buffer portion of the disk, and to write the data from the buffer portion of the disk to the original block address on the disk responsive to when the disk drive is determined to have reached the threshold operating temperature.

18. The disk drive of claim 17, wherein the controller is further configured to write the data from the buffer portion of the disk to the original block address on the disk responsive to when a write command from a host device is not waiting to be performed and the disk drive is determined to have reached the threshold operating temperature.

19. The disk drive of claim 17, wherein the controller is further configured to write the data a first time from the buffer portion of the disk to the original block address on the disk, to determine an accuracy of the data written the first time at the original block address on the disk, and to selectively rewrite the data a second time from the buffer portion of the disk to the original block address on the disk responsive to the determined accuracy of the data written the first time.

20. The disk drive of claim 17, wherein the controller is further configured to erase the data from the buffer portion of the disk after the data is written to the original block address on the disk.

21. The disk drive of claim 20, wherein the controller is further configured to delay erasing the data on the buffer portion of the disk until after the disk drive is determined to have reached the threshold operating temperature.

22. The disk drive of claim 1, wherein the controller is further configured to determine whether the disk drive has reached the threshold operating temperature by writing known data to the disk, reading back from the disk the written known data, and comparing the written known data and the read back data to determine whether the disk drive has reached the threshold operating temperature.

23. The disk drive of claim 1, wherein:
the disk drive further comprises an integrated circuit host command queue that is configured to buffer data and associated block addresses of write commands from the host device; and
the controller is further configured to write the data and associated block address of each write command to the buffer portion of the disk when the host command queue is set to a disabled state, to generate to the host device responsive to completing the writing of the data and associated block address of each of the write commands a write completion signal that indicates that a write command has been completed, and to write the data from the host command queue to the associated block address on the disk, wherein at least some of the time the write completion signal is generated to the host device before the data from the host command queue is written to the associated block address on the disk.

24. The disk drive of claim 23, wherein the controller is further configured to write data that resides on the buffer portion of the disk to the associated block address on the disk upon power of the disk drive, and to delete data from the buffer portion of the disk after it has been written to the associated block address on the disk.

25. A disk drive comprising:
a rotatable data storage disk;
a transducer that is configured to read and write data on the disk;
an actuator that is configured to position the transducer relative to defined portions of the disk; and
a controller that is configured to write a predetermined magnetic polarity pattern on a buffer portion of the disk to erase data thereon, to determine whether the disk drive has reached a threshold operating temperature, to generate a first portion and a second portion of error correcting information from data from a host devise, to write the data and the first portion of error correction information to a block address on the disk through the transducer, to write the second portion of the error correcting information to the buffer portion of the disk responsive to when the disk drive is determined to have not reached the threshold operating temperature, to read the data and the first portion of the error correction information from the block address of the disk, to use the first portion of the error correcting information to attempt to correct errors in the read data and, when an uncorrected error remains in the read data, to then use the second portion of the error correcting information from the buffer portion of the disk to attempt to correct errors in the read data.

26. A disk drive comprising:
an integrated circuit memory;
a rotatable data storage disk;
a transducer that is configured to read and write data on the disk;
an actuator that is configured to position the transducer relative to defined portions of the disk; and
a controller that is configured to determine whether the disk drive has reached a threshold operating temperature, to selectively direct data from a host device that is addressed for an associated original block address on the disk to be written to the integrated circuit memory when the disk drive is determined to have not reached the threshold operating temperature, to copy the data from the integrated circuit memory to the original block address on the disk responsive to when the disk drive is determined to have reached the threshold operating temperature, to direct the data from the host device to be written to both the integrated circuit memory and to the original block address on the disk responsive to when the disk drive is determined to have not reached the threshold operating temperature, and to write the data to only the original block address on the disk responsive to when the disk drive is determined to have reached the threshold operating temperature.

27. A disk drive comprising:
an integrated circuit memory;
a rotatable data storage disk;
a transducer that is configured to read and write data on the disk;
an actuator that is configured to position the transducer relative to defined portions of the disk; and
a controller that is configured to write a predetermined magnetic polarity pattern on a buffer portion of the disk to erase data thereon, to determine whether the disk drive has reached a threshold operating temperature, to generate a first portion and a second portion of error correcting information from data from a host devise, to write the data and the first portion of error correction information to a block address on the disk through the transducer, to write the second portion of the error correcting information to the integrated circuit memory responsive to when the disk drive is determined to have not reached the threshold operating temperature, to read the data and the first portion of the error correction information from the block address of the disk, to use the first portion of the error correcting information to attempt to correct errors in the read data and, when an uncorrected error remains in the read data, to then use the second portion of the error correcting information from the integrated circuit memory to attempt to correct errors in the read data.

* * * * *